Nov. 9, 1954  R. B. TROUSDALE  2,694,172
DIRECT CURRENT POWER SUPPLY
Filed Oct. 14, 1953
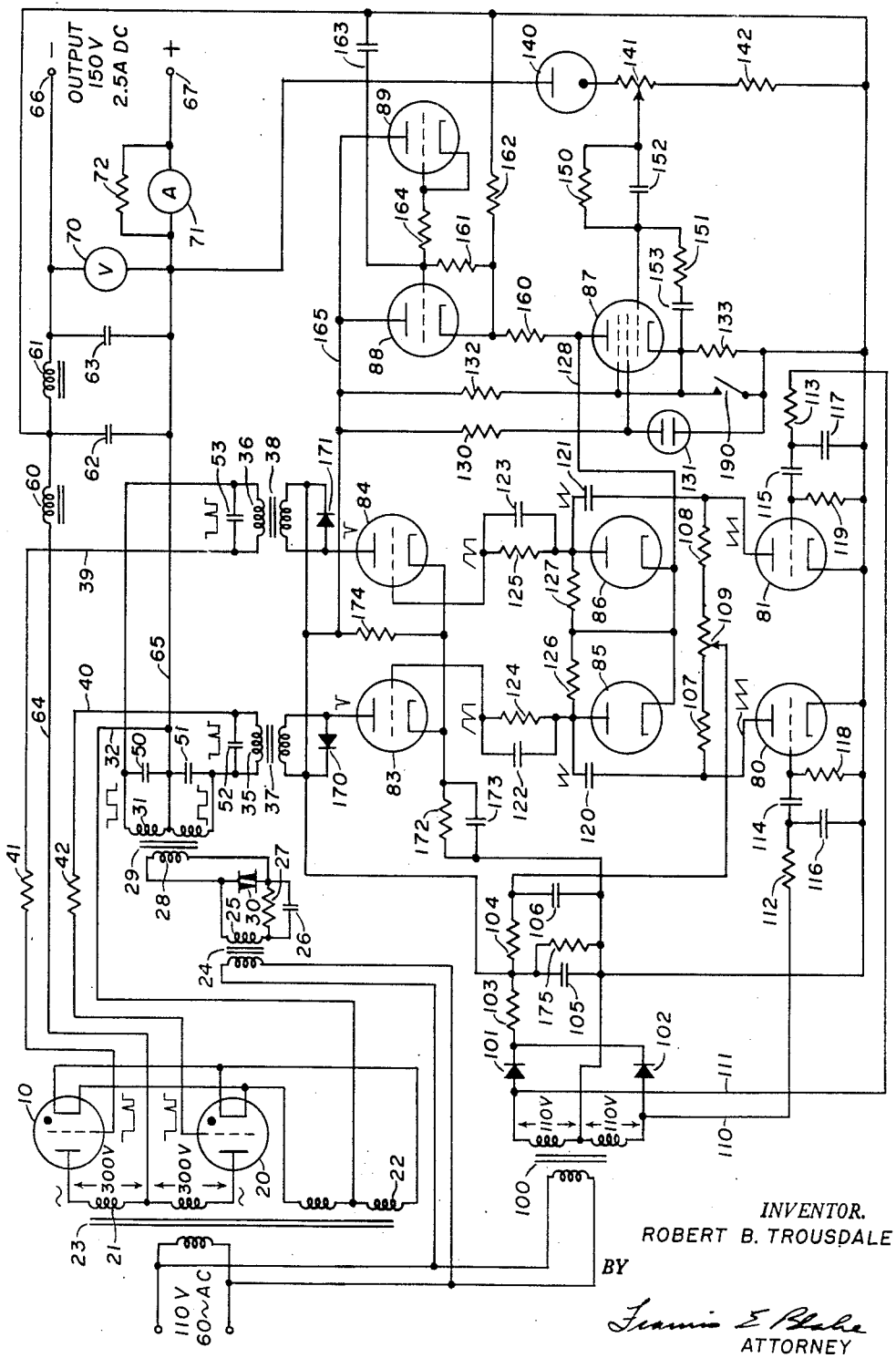
INVENTOR.
ROBERT B. TROUSDALE
BY
Francis E Blake
ATTORNEY

United States Patent Office 2,694,172
Patented Nov. 9, 1954

2,694,172

DIRECT CURRENT POWER SUPPLY

Robert B. Trousdale, Webster, N. Y., assignor to Stromberg-Carlson Company, a corporation of New York Application October 14, 1953, Serial No. 385,951

22 Claims. (Cl. 321—13)

The present invention relates to power supplies and more particularly to an electronically controlled voltage regulated rectifier type of direct current power supply.

Most of the more commonly used voltage regulated direct current rectifier type power supplies employ one of two basic circuit principles of operation. With one arrangement, a so-called series regulator tube is used and with the other arrangement, grid controlled gaseous discharge rectifier tubes are used. Each arrangement has its own its own well known advantages and disadvantages. The present invention is concerned with improvements in voltage regulated direct current rectifier power supplies of the type using grid controlled gaseous discharge rectifier tubes.

Prior to this invention it has been customary to provide delay relays in rectifier tube protection circuits for controlling the application of the anode alternating currents to the gaseous discharge rectifier tubes in a manner to prevent such current applications until the cathodes of the tubes are fully warmed-up and are emitting electrons in sufficient quantities and also until the grid bias voltage supply is properly functioning to control the electron flow. The grid bias arrangements for the control electrode of the rectifier tube as previously known, customarily employed circuits for applying a direct current bias voltage to the control electrode with a potential and polarity such as normally prevent the rectifier tube from conducting. To then enable the rectifier tube to conduct, a suitable firing potential was superimposed on the direct current bias voltage and the timing was automatically adjusted in accordance with load demands to thereby maintain the voltage at a constant value. For example, should the firing voltage be applied at a time very late in the period that the polarity of the applied alternating current potential to the rectifier tube anode was positive, very little current would flow through the rectifier tube and the demand of only a very light load could be satisfied. Conversely, if the firing voltage were applied at a time very early in the period that the polarity of the alternating current potential applied to the rectifier tube anode was positive, a maximum amount of current would flow to satisfy a maximum load demand. However, before this invention, there have been limitations to the range of firing control in view of the instabilities encountered when it was attempted to control the firing of the rectifier tube either very early or very late in the period when the polarity of the alternating current potential applied to the rectifier tube anode was positive.

It is a principal object of this invention to provide an improved form of regulated rectifier type of uni-directional current supply employing grid-controlled gaseous discharge rectifier tubes.

Another important object of the invention is to provide a power supply of the character described in which the gaseous discharge rectifier tubes are inherently protected at all times without the use of mechanically operated time delay relays.

Yet another important object of the invention is to provide an improved voltage regulated rectifier power supply of the type using grid-controlled gaseous discharge rectifier tubes in a circuit arrangement enabling maximum flexibility of control with complete stability whereby the firing of the rectifier tubes may be controlled to occur at any time when the polarity of the applied alternating current potential on the rectifier tube anode is positive.

A feature of the invention is the provision of an alternating current grid bias voltage supply for the control electrode of the gaseous discharge rectifier tubes, the grid bias voltage having a square waveform and a phase relation opposite to the phase of the alternating current potential applied to the anode of the rectifier tube so that the relative instantaneous potentials and polarities are such as to prevent the rectifier tube from firing. In this arrangement the source of the alternating current grid bias voltage is instantly operative simultaneously with the application of alternating current potential to the anode of the rectifier tube so that the rectifier tube is inherently protected during he initial warm-up interval.

Another feature of the invention as it relates to the automatic voltage regulation of the rectified output current is the provision of a third intermittent control voltage having a peaked waveform and a repetition frequency equal to the frequency of the alternating current grid bias voltage and connected to be superimposed on the grid bias to the gaseous discharge rectifier tube control grid with a potential and polarity such as to fire the tube at times when both the intermittent peaked voltage occurs and the polarity of the applied alternating current potential on the rectifier tube anode is positive. In this connection, timing means is provided to predetermine the instant of generation of the intermittent peaked voltage with relation to the regularly recurring time intervals when the polarity of the potential applied to the rectifier tube anode is positive. Additionally, the timing means is provided with control means responsive to variations in rectifier voltage output to vary the instant of generation of the intermittent peak voltage that is superimposed on the alternating current bias voltage so that the firing instant of the rectifier tube is automatically controlled to maintain constant the rectified output voltage.

Another feature of the invention is the provision of an automatically resettable electronic time delay circuit for the timing control means to prevent the generation of the intermittent peaked voltage control signals at times when the polarity of the applied potential on the rectifier tube anode is positive until a predetermined time after each initial application of the operating current for the power supply.

Further objects, features, and the attending advantages of the invention will be apparent with reference to the following specification and drawing in which the sole figure is a schematic wiring diagram.

Briefly stated, in practicing the invention, a pair of grid control gaseous discharge devices, such as thyratron tubes, are connected in a full wave rectifying circuit. It should be pointed out that the features of the invention to be described may be used with either a full wave or half-wave type of rectifier power supply as will be apparent to those skilled in the art. An alternating current bias voltage having a square waveform is connected to the control electrode or grid of each rectifier tube with a polarity and potential relative to the polarity of the applied potential on the rectifier tube anode to normally maintain the rectifier tubes non-conductive. Under such circumstances, the rectifier power supply output is, of course, zero. The alternating current square wave bias voltage is one of the important features of the invention in that the bias voltage is instantaneously available concurrently with the application of operating potentials to the anode cathode circuits of the rectifier tubes so that the rectifier tubes are instantly protected during their warm-up periods without requiring the use of mechanically operated delay relay circuits or the like.

In order to fire the grid control gaseous discharge tubes at a controlled time during the time that the potential of the voltage applied to the rectifier tubes anode is positive, a firing voltage having an intermittent peaked waveform is superimposed on the square wave grid bias voltage. The intermittent control voltage is generated and controlled by timing and control circuits which are responsive to variations in the voltage output of the voltage supply as determined by load demands, in a manner such that the firing of the rectifier tube will occur earlier when higher load demands are to be met and vice versa.

The above described timing and control circuits include thermionically heated electron discharge tubes and the circuit arrangement is such that intermittent control voltage cannot be generated during the warm-up period of the rectifier tubes, or the control voltage, if generated, is so timed with relation to the application of the alternating potential to the anode electrodes of the rectifier tube that such control voltage occurs while the applied rectifier tube voltage is negative. In such manner, additional safeguards are provided by the features of the invention to protect the rectifier tubes during their warm-up periods.

As an additional protection for the functioning of the power supply, the control tube for controlling the timing of the intermittent control voltage is supplied with operating potential through a series connected delay tube which must be thermionically heated and fully operating in order to pass sufficient operating potential to the control tube. The delay tube includes a control electrode biased by a circuit including a capacitor having a predetermined charging time constant to additionally prevent the flow of operating potential to the control tube until after the capacitor is fully charged. In order to instantly reset the delay tube circuit including the aforementioned capacitor charging circuit, a uni-directional discharge path for the capacitor is provided in a manner to instantly discharge the capacitor whenever the applied potential to the delay tube and control tube is disconnected or reduced to zero.

Referring to the drawing for a detailed description of the invention, the gaseous grid control rectifier tubes are shown at 10 and 20 to have their anode and cathode electrodes connected in a full wave rectifying circuit to the secondary windings 21 and 22 of the alternating current power transformer 23, as may be conventional. An alternating current bias transformer 24 is provided with a secondary winding 25 connected in series with a capacitor 26 and shunt connected resistor 27, and the primary winding 28 of a transformer 29. A varistor 30 is connected in parallel with the primary winding 28 of the transformer and the circuit constants are such that an alternating current of a square waveform is generated in the secondary winding 31 of the transformer 29. The secondary winding 31 is center tapped and connected by conductor 32 to the center tap of the rectifier tube cathode heating transformer secondary winding 22. The outer terminals of the secondary winding of the transformer 29 are connected through respective secondary windings 35, 36, of the peaking transformers 37, 38, to conductors 39, 40, and through current limiting resistors 41 and 42 to the respective control electrodes of the rectifier tubes 10 and 20. The phasing and polarity of the grid bias voltage developed in the aforementioned circuits including the capacitors 50–53, the elements all having suitable constants, is such that the phase and polarity of the square wave voltage applied across the control and cathode electrodes of the rectifier tubes 10 and 20 is opposite to the phase and polarity of the potential applied across their anode and cathode electrodes. It should be apparent that with such phase relationships the rectifier tubes 10 and 20 are maintained non-conductive and no direct current output is produced.

With reference to the direct current to be produced, filter chokes 60 and 61 together with filter capacitors 62 and 63 are connected in a filter network having input terminals 64 and 65 connected to the center taps of secondary windings 21 and 22 of power transformer 23. The filter network output terminals 66 and 67 may be connected to a desired load circuit (not shown). The volt meter 70 is connected across the filter capacitor 63 to indicate the voltage output of the circuit and the ammeter 71 having a meter shunt resistance 72 is connected in series with the positive lead of the filter network to the load terminal 67 in a manner to indicate load current variations. In this connection it will be noted that the filter chokes 60 and 61 are connected in the negative lead of the power supply in order that their reactances will not materially affect the reactances of the grid cathode alternating current bias circuits for the rectifier tubes 10 and 20 as previously described.

In order to fire the rectifier tubes 10 and 20 in a manner to obtain a direct current output, an intermittent control voltage of peaked waveform is developed in the secondary windings 35 and 36 of the voltage peaking transformers 37 and 38. For developing this control voltage, a timing circuit, including thermionically heated electron discharge tubes 80, 81, 83 and 84, is provided. For controlling the timing of the instantaneous generation of the intermittent control voltage, clamping tubes 85 and 86 are controlled by a control tube 87 which is responsive to variations in direct current output voltage of the power supply. To delay the functioning of the control tube 87 for a predetermined time interval following each initial application of operating potentials to the power supply, the delay tube 88 and associated diode connected tube 89 are provided. The detailed circuit elements associated with tubes 80—89 will now be described.

Referring first to the control voltage generating and timing circuits, tubes 80 and 81 are connected in a wave shaping circuit supplied with direct current operating potential from the full wave rectifier circuit including power transformer 100 and selenium rectifiers 101 and 102. The direct current output of such low voltage power supply is filtered by resistors 103, 104, and filter capacitors 105, 106. The direct current output appearing across the capacitor 106 is connected across the plate and cathode electrodes of saw-tooth generator tubes 80 and 81 by means of plate load resistors 107, 108, and hum balancing potentiometer 109. Alternating current in the proper phase is connected by conductors 110 and 111 through a phasing network including resistors 112 and 113, capacitors 114–117, and grid load resistors 118 and 119 to the respective generator tubes 80 and 81 in a manner such that a saw-tooth output voltage having the waveform indicated is developed across the anode load resistors 107 and 108. The aforementioned saw-tooth waveform output voltage is of the same frequency as the frequency of alternating current supply voltage to transformers 23, 24 and 100. The saw-tooth output voltage appearing across the load resistors 107 and 108 is connected by a network including capacitors 120, 121, and capacitors 122, 123, to the respective control electrodes of the peaking tubes 83 and 84. Load resistors 124 and 125 are respectively connected in parallel with capacitors 122, 123, and are also connected to the anode electrodes of the diode clamping tubes 85, 86, respectively. Resistors 126 and 127 are connected between the respective anode and cathode electrodes of clamping diodes 85 and 86, and the cathode electrodes of such diodes are connected together by conductor 128 to the anode of the control tube 87.

The control tube 87 is shown to be a multi-grid pentode type of electron discharge tube although it should be understood that other forms of tubes may be used for this purpose. The screen electrode of the control tube 87 is connected in series with a voltage dropping resistance 130 to the positive potential of the low voltage rectifier as appearing across the filter capacitor 105 and a glow tube 131 functions to regulate the potential of the screen voltage as dropped through the voltage dropping resistor 130. The suppressor grid and cathode of the control tube 87 are connected together and are biased by a circuit including the voltage dropping resistor 132 and cathode bias resistance 133 connected across the aforementioned low voltage direct current output appearing across filter capacitor 105. The control grid of the control tube 87 is connected to a network including the voltage regulator gas tube 140, potentiometer 141 and resistance 142 connected across the filter capacitor 62 of the filter network for the power supply output voltage to be regulated. The antihunt network, including resistors 150, 151, and capacitors 152, 153, is included in this circuit and the arrangement is such that a rise in the output voltage to be regulated causes the grid of the control tube 87 to be more positive increasing the current drawn through the anode load resistor 160 and lowering the potential at the anode of the control tube 87 and the conductor 128 to the cathodes of the clamping tubes 85 and 86.

Considering for the moment the delay circuit controlling the operating potential supplied to the anode of the control tube 87, it will be seen that the positive voltage source for the anode of the control tube 87 is connected through the anode load resistance 160 and the series connected delay tube 88. The thermionically heated delay tube 88 must be fully heated in operating condition in order to pass sufficient current for applying an operating potential to the anode of the control tube 87. For providing an additional delay factor, the control grid of the delay tube 88 is connected in a bias circuit including resistors 161, 162, and a charging capacitor 163 such that the tube 88 is biased to be non-conducting until the capacitor 163 is charged. In the event that the power supply is turned on and then turned off before it is fully warmed-up and operating, the delay circuit including the capacitor 163 must be instantly reset and, for this purpose, a uni-directional conducting device, such as the diode connected electron discharge tube 89, is provided for instantaneously discharging the capacitor 163 through the resistor 164 when the direct current potential in the conductor 165 is reduced to zero.

The control circuit including the control tube 87, and the clamping circuit including the clamp diodes 85 and 86, function to vary the minimum and maximum potentials of the saw-tooth waveform currents as applied to the control grids of the peaking tubes 83 and 84 in accordance with the variations of the power supply direct current voltage output to be regulated. The arrangement is such that, as the direct current voltage to be regulated increases, the minimum and maximum potentials of the saw-tooth voltage are reduced and vice versa.

The peaking tubes 83 and 84 are connected with their respective anode electrodes in circuit through primary winding of peaking transformers 37 and 38 to the direct current positive potential of the low voltage power supply appearing across the filter capacitor 105. Rectifying devices 170, 171 are connected in parallel with the primary windings of the peaking transformers 37, 38, to prevent the generation of opposite going peak voltages. The cathode electrodes of the peaking tubes 83, 84 are connected together and through a biasing network including the resistors 172 and 174 connected across the terminals of the low voltage power supply and the potential appearing across tthe filter capacitor 105. The value of the biasing resistor 172 is such that the peaking tubes 83, 84 are biased to be non-conductive until the potential of the saw-tooth voltage applied to their control grids reaches a certain value as indicated by the point of truncation of the saw-tooth voltage. At that instant, the tubes 83 and 84 conduct to generate a peak voltage in the primary windings of the respective peaking transformers 37 and 38. This intermittent peak voltage is induced by the secondary windings 35, 36 of the respective peak transformers to be superimposed on the alternating current square wave bias voltage as indicated to be connected to the control electrode of the rectifier tubes 10, 20, respectively. It should now be apparent that the instant at which the respective peaking tubes 83, 84 become conductive will determine the instant of application of a firing potential to the respective rectifier tubes 10, 20, and if such instant occurs at a time when the polarity of the potential of alternating current to the rectifier tube anode is positive, the rectifier tube will be fired to remain conductive through the remainder of such interval when its anode is positive. It should also be now apparent that the instant when the respective peaking tubes 83, 84, conduct is determined by the operation of the clamping tubes 85 and 86 and the control tube 87, which functions as previously described, to vary the relative swinging potential of the saw-tooth voltage with respect to power supply ground. This should be more obvious when it is remembered that the amount of grid potential for making the peaking tubes 83, 84, conduct is fixed by the value of the bias resistances 172 and 174.

Referring back to the functioning of the delay circuit tubes 88 and 89, the values for this circuit and the circuit of the control tube 87 are so chosen with relationship to the values of the clamping tube circuits that when delay tube 88 is non-conductive or when the capacitor 163 is not fully charged, the instant of generation for the peaked control voltage by the peaking tubes 83, 84, is either not at all or at a time when the polarity of the applied voltage to the anode electrodes of the rectifier tubes is negative. Under such conditions the rectifier tubes 10, 20, cannot be fired. However, as the delay tube 88 warms-up to become fully operating, and the charged condition of the capacitor 163 approaches its maximum charged potential, the instant of generation of the peaked control voltage is gradually advanced to occur first at a time when the polarity of the rectifier tube anode is just going negative, and later to a time when the anode voltage is going positive. Obviously, after the various tubes in the circuit are all fully operating, the control tube 87 functions to shift the timing for the instant of the generation of the peaked control voltage relative to the positive going cycle of the applied voltage to the rectifier tubes 10, 20, in a manner to satisfy the varying load demands and to maintain the output voltage as indicated by the volt meter 70 at its constant value. In this connection, of course, the potentiometer 141 is adjustable to determine the value of the regulated voltage output.

It is a feature of the invention to provide the switch 190 in order to enable the control of the regulated output voltage to be instantly reduced to zero without removing the operating potentials for the various tubes in the circuit. Switch 190 is provided in a circuit by passing the control tube cathode bias resistor 133. When the switch 190 is closed to short circuit the bias resistor 133, the control tube 87 and clamp tubes 85, 86, function to reduce the minimum and maximum potentials of the saw-tooth voltage to such a value that the peaking tubes 83, 84, become conductive to generate the intermittent peak control voltage only at times when the polarity of the applied voltage to the anode electrode of the rectifier tubes 10, 20, is negative. Thus, in such manner, with switch 190 closed, the rectifier tubes 10, 20, are maintained non-conductive at all times by the alternating current square wave bias voltage and the absence of a firing control voltage at times when their anode potentials are positive.

For a further understanding of the invention the following listed tables of values for the various components in one embodiment of my invention is given.

| Component | Value |
|---|---|
| Tube 10 | Type C3JA. |
| Tube 20 | Type C3JA. |
| Tube 80 | Type 6C4. |
| Tube 81 | Type 6C4. |
| Tube 83 | Type 6AQ6. |
| Tube 84 | Type 6AQ6. |
| Tube 85 (½) | Type 6AL5. |
| Tube 86 (½) | Type 6AL5. |
| Tube 87 | Type 6AU6. |
| Tube 88 | Type 6C4. |
| Tube 89 | Type 6C4. |
| Tube 131 | Type NE2. |
| Tube 140 | Type OB2. |
| Resistance 27 | 560 ohms. |
| Resistance 41 | 10,000 ohms. |
| Resistance 42 | 10,000 ohms. |
| Resistance 103 | 220 ohms. |
| Resistance 104 | 47,000 ohms. |
| Resistance 107 | 330,000 ohms. |
| Resistance 108 | 330,000 ohms. |
| Resistance 109 | 50,000 ohms. |
| Resistance 112 | 27,000 ohms. |
| Resistance 113 | 27,000 ohms. |
| Resistance 118 | 2.2 megohms. |
| Resistance 119 | 2.2 megohms. |
| Resistance 124 | 1 megohm. |
| Resistance 125 | 1 megohm. |
| Resistance 126 | 1 megohm. |
| Resistance 127 | 1 megohm. |
| Resistance 130 | 47,000 ohms. |
| Resistance 132 | 12,000 ohms. |
| Resistance 133 | 2,700 ohms. |
| Resistance 150 | 100,000 ohms. |
| Resistance 151 | 220 ohms. |
| Resistance 160 | 220,000 ohms. |
| Resistance 161 | 3.3 megohms. |
| Resistance 162 | 1 megohm. |
| Resistance 164 | 1 megohm. |
| Resistance 172 | 6,800 ohms. |
| Resistance 174 | 15,000 ohms. |
| Resistance 175 | 10,000 ohms. |
| Capacitor 26 | 2 microfarads. |
| Capacitor 50 | .022 microfarad. |
| Capacitor 51 | .022 microfarad. |
| Capacitor 52 | 1,000 micro-microfarads. |
| Capacitor 53 | 1,000 micro-microfarads. |
| Capacitor 62 | 480 microfarads. |
| Capacitor 63 | 480 microfarads. |
| Capacitor 105 | 40 microfarads. |
| Capacitor 106 | 40 microfarads. |
| Capacitor 114 | .05 microfarad. |
| Capacitor 115 | .05 microfarad. |
| Capacitor 116 | .1 microfarad. |
| Capacitor 117 | .1 microfarad. |
| Capacitor 120 | .1 microfarad. |
| Capacitor 121 | .1 microfarad. |
| Capacitor 122 | 3,300 micro-microfarads. |
| Capacitor 123 | 3,300 micro-microfarads. |
| Capacitor 152 | 1 microfarad. |
| Capacitor 153 | 250 microfarads. |
| Capacitor 163 | 1 microfarad. |
| Capacitor 173 | 1 microfarad. |

Various modifications may be made within the spirit of the invention and the scope of the appended claims.

What is claimed is:

1. A direct current regulated rectifier voltage supply comprising, a first source of alternating current potential, at least one gaseous discharge rectifier tube having anode, control and cathode electrodes, means to heat said rectifier tube cathode for producing a stream of electrons, means connecting said first source across the anode and cathode electrodes of said rectifier tube for producing a direct current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential having an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, timing means for said third source to determine the instant of generation of said peak voltage during each cycle of the potential connected to said rectifier tube anode, a filter network having input and output terminals, means connecting said direct current output to the input terminals of said filter network, and control means for said timing means and connected to said output terminals to be responsive to variations in direct current output voltage in a manner to vary the instant of generation of said intermittent potential within a given cycle of the potential connected to said rectifier tube anode whereby the instant when said tube is fired may be varied to thereby vary the total tube conduction period and maintain constant the direct current output voltage.

2. A direct current regulated rectifier voltage supply comprising, a first source of alternating current potential, at least one gaseous discharge rectifier tube having anode, control and cathode electrodes, means to heat said rectifier tube cathode for producing a stream of electrons, means connecting said first source across the anode and cathode electrodes of said rectifier tube for producing a direct current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential having an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, timing means for said third source to determine the instant of generation of said peak voltage during each cycle of the potential connected to said rectifier tube anode, a filter network having input and output terminals, means connecting said direct current output to the input terminals of said filter network, control means for said timing means and connected to said output terminals to be responsive to variations in direct current output voltage in a manner to vary the instant of generation of said intermittent potential within a given cycle of the potential connected to said rectifier tube anode whereby the instant when said tube is fired may be varied to thereby vary the total tube conduction period and maintain constant the direct current output voltage, and switch means in said control means connected when closed to predetermine the instant of generation of said intermittent potential to occur only at times when the polarity of the potential connected to the anode of said rectifier tube is negative to thus prevent the tube from firing and current from flowing therethrough to thereby reduce the direct current output to zero.

3. A direct current regulated rectifier voltage supply comprising, a first source of alternating current potential, at least one gaseous discharge rectifier tube having anode, control and cathode electrodes, means to heat said rectifier tube cathode for producing a stream of electrons, means connecting said first source across the anode and cathode electrodes of said rectifier tube for producing a direct current output during the periods of conduction of said tube, a second source of alternating current potential having essentially a square waveform and a frequency equal to the frequency of current from said first source, means connecting said second source across said rectifier tube control and cathode electrodes in opposite phase to the phase of the current connected to said rectifier tube anode, the relative instantaneous polarities and potentials of only said first and second sources connected to the electrodes of said rectifier tube being such as to prevent the tube from firing and current from flowing therethrough, a third source of potential including a thermionic tube for generating a potential with an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, said thermionic tube having a warm-up interval at least equal to the warm-up interval of said means to heat said rectifier tube cathode, timing means for said third source to determine the instant of generation of said peak voltage during each cycle of the potential connected to said rectifier tube anode, a filter network having input and output terminals, means connecting said direct current output to the input terminals of said filter network, and control means for said timing means and connected to said output terminals to be responsive to variations in direct current output voltage in a manner to vary the instant of generation of said intermittent potential within a given cycle of the potential connected to said rectifier tube anode whereby the instant when said tube is fired may be varied to thereby vary the total tube conduction period and maintain constant the direct current output voltage.

4. A direct current regulated rectifier voltage supply comprising, a first source of alternating current potential, at least one gaseous discharge rectifier tube having anode, control and cathode electrodes, means to heat said rectifier tube cathode for producing a stream of electrons, means connecting said first source across the anode and cathode electrodes of said rectifier tube for producing a direct current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential including a thermionic tube for generating a potential with an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, said thermionic tube having a warm-up interval at least equal to the warm-up interval of said means to heat said rectifier tube cathode, timing means for said third source to determine the instant of generation of said peak voltage during each cycle of the potential connected to said rectifier tube anode, a filter network having input and output terminals, means connecting said direct current output to the input terminals of said filter network, control means for said timing means and connected to said output terminals to be responsive to variations in direct current output voltage in a manner to vary the instant of generation of said intermittent potential within a given cycle of the current connected to said rectifier tube anode whereby the instant when said tube is fired may be varied to thereby vary the total tube conduction period and maintain constant the direct current output voltage, and switch means in said control means connected when closed to predetermine the instant of generation of said intermittent potential to occur only at times when the polarity of the potential connected to the anode of said rectifier tube is negative to thus prevent the tube from firing and current from flowing therethrough to thereby reduce the direct current output to zero.

5. The invention of claim 1 wherein said control means includes a thermionic tube having at least anode, control and cathode electrodes, means connecting a portion of said direct current output voltage across the control and cathode electrodes of said thermionic tube, a source of direct current connected in series with a load resistance across the anode and cathode electrodes of said thermionic tube, and means connecting the anode of said thermionic tube to said timing means in a manner such that a rise in the potential of said anode causes the instant of generation of said peak voltage to occur earlier in the time that the polarity of the potential connected to the anode of said rectifier tube is positive.

6. The invention of claim 3 wherein said control means includes a second thermionic tube having at least anode, control and cathode electrodes, means connecting a portion of said direct current output voltage across the control and cathode electrodes of said second thermionic tube, a source of direct current connected in series with a load resistance across the anode and cathode electrodes of said second thermionic tube, and means connecting the anode of said second thermionic tube to said timing means in a manner such that a rise in the potential of said anode causes the instant of generation of said peak voltage to occur earlier in the time that the polarity of the potential connected to the anode of said rectifier tube is positive.

7. The invention of claim 1 wherein said control means includes a thermionic tube having at least anode, control and cathode electrodes, means connecting a portion of said direct current output voltage across the control and cathode electrodes of said thermionic tube, a source of direct current connected in series with a load resistance across the anode and cathode electrodes of said thermionic tube in series with a cathode bias resistance, means connecting the anode of said thermionic tube to said timing means in a manner such that a rise in the potential of said anode causes the instant of generation of said peak voltage to occur earlier in the time that the polarity of the potential connected to the anode of said rectifier tube is positive, and switch means connected across said cathode bias resistance and adapted when closed to short circuit said resistance and lower the potential of the anode of said thermionic tube to a value such that said timing means is ineffective to permit the instant of generation of said peak voltage to occur at any time when the polarity of the potential connected to the anode of said rectifier tube is positive.

8. The invention of claim 3 wherein said control means includes a second thermionic tube having at least anode, control and cathode electrodes, means connecting a portion of said direct current output voltage across the control and cathode electrodes of said second thermionic tube in series with a cathode bias resistance, a source of direct current connected across the anode and cathode electrodes of said second thermionic tube, means connecting the anode of said second thermionic tube to said timing means in a manner such that a rise in the potential of said anode causes the instant of generation of said peak voltage to occur earlier in the time that the polarity of the potential connected to the anode of said rectifier tube is positive, and switch means connected across said cathode bias resistance and adapted when closed to short circuit said resistance and lower the potential of the anode of said second thermionic tube to a value such that said timing means is ineffective to permit the instant of generation of said peak voltage to occur at any time when the polarity of the potential connected to the anode of said rectifier tube is positive.

9. The invention of claim 1 wherein said control means includes a thermionic tube having at least anode, control and cathode electrodes, means connecting a portion of said direct current output voltage across the control and cathode electrodes of said thermionic tube, a source of direct current connected across the anode and cathode electrodes of said thermionic tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, and time delay means in the connection of said source of direct current across the anode and cathode electrodes of said thermionic tube to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

10. The invention of claim 3 wherein said control means includes a second thermionic tube having at least anode, control and cathode electrodes, means connecting a portion of said direct current output voltage across the control and cathode electrodes of said second thermionic tube, a source of direct current connected across the anode and cathode electrodes of said second thermionic tube, means connecting the anode of said second thermionic tube to said timing means in a manner such that a rise in the potential of said anode causes the instant of generation of said peak voltage to occur earlier in the time that the polarity of the potential connected to the anode of said rectifier tube is positive, and time delay means in the connection of said source of direct current across the anode and cathode electrodes of said second thermionic tube to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

11. The invention of claim 1 wherein said control means includes a thermionic tube having at least anode, control and cathode electrodes, means connecting a portion of said direct current output voltage across the control and cathode electrodes of said thermionic tube, a source of direct current connected across the anode and cathode electrodes of said thermionic tube in series with a cathode bias resistance, means connecting the anode of said thermionic tube to said timing means in a manner such that a rise in the potential of said anode causes the instant of generation of said peak voltage to occur earlier in the time that the polarity of the potential connected to the anode of said rectifier tube is positive, time delay means in the connection of said source of direct current across the anode and cathode electrodes of said thermionic tube to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons, and switch means connected across said cathode bias resistance and adapted when closed to short circuit said resistance and lower the potential of the anode of said thermionic tube to a value such that said timing means is ineffective to permit the instant of generation of said peak voltage to occur at any time when the polarity of the potential connected to the anode of said rectifier tube is positive.

12. The invention of claim 3 wherein said control means includes a second thermionic tube having at least anode, control and cathode electrodes, means connecting a portion of said direct current output voltage across the control and cathode electrodes of said second thermionic tube in series with a cathode bias resistance, a source of direct current connected across the anode and cathode electrodes of said second thermionic tube, means connecting the anode of said second thermionic tube to said timing means in a manner such that a rise in the potential of said anode causes the instant of generation of said peak voltage to occur earlier in the time that the polarity of the potential connected to the anode of said rectifier tube is positive, time delay means in the connection of said source of direct current across the anode and cathode electrodes of said second thermionic tube to initially prevent the rise in potential of the anode of said second thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons, and switch means connected across said cathode bias resistance and adapted when closed to short circuit said resistance and lower the potential of the anode of said second thermionic tube to a value such that said timing means is ineffective to permit the instant of generation of said peak voltage to occur at any time when the polarity of the potential connected to the anode of said rectifier tube is positive.

13. A regulated rectifier uni-directional current supply comprising, a first source of alternating current potential, at least one gaseous discharge rectifier tube having anode, control and cathode electrodes, means connecting said first source across the anode and cathode electrodes of said rectifier tube for producing a uni-directional current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential having an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, timing means for said third source to determine the instant of generation of said peak voltage during each cycle of the potential connected to said rectifier tube anode, and control means for said timing means and responsive to variations in the uni-directional current output in a manner to vary the instant of generation of said intermittent potential within a given cycle of the potential connected to said rectifier tube anode whereby the instant when said tube is fired may be varied to thereby vary the total tube conduction period and maintain constant the uni-directional current output.

14. A regulated rectifier uni-directional current supply comprising, a first source of alternating current potential, at least one gaseous discharge rectifier tube having anode, control and cathode electrodes, means connecting said first source across the anode and cathode electrodes of said rectifier tube for producing a uni-directional current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential having an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, timing means for said third source to determine the instant of generation of said peak voltage during each cycle of the potential connected to said rectifier tube anode, control means for said timing means and responsive to variations in the uni-directional current output in a manner to vary the instant of generation of said intermittent potential within a given cycle of the potential connected to said rectifier tube anode whereby the instant when said tube is fired may be varied to thereby vary the total tube conduction period and maintain constant the uni-directional current output, and switch means in said control means connected when closed to predetermine the instant of generation of said intermittent potential to occur only at times when the polarity of the potential connected to the anode of said rectifier tube is negative to thus prevent the tube from firing and current from flowing therethrough to thereby reduce the uni-directional current output to zero.

15. A regulated rectifier uni-directional current supply comprising, a first source of alternating current potential, at last one gaseous discharge rectifier tube having anode, control and cathode electrodes, means to heat said rectifier tube cathode for producing a stream of electrons, means connecting said first source across the anode and cathode electrodes of said rectifier tube for producing a uni-directional current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential including a thermionic tube for generating a potential with an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, said thermionic tube having a warm-up interval at least equal to the warm-up interval of said means to heat said rectifier tube cathode, timing means for said third source to determine the instant of generation of said peak voltage during each cycle of the potential connected to said rectifier tube anode, and control means for said timing means to be responsive to variations in the uni-directional current output in a manner to vary the instant of generation of said intermittent potential within a given cycle of the potential connected to said rectifier tube anode whereby the instant when said tube is fired may be varied to thereby vary the total tube conduction period and maintain constant the uni-directional current output.

16. A regulated rectifier uni-directional current supply comprising, a first source of alternating current potential, at least one gaseous discharge rectifier tube having anode, control and cathode electrodes, means to heat said rectifier tube cathode for producing a stream of electrons, means connecting said first source across the anode and cathode electrodes of said rectifier tube for producing a uni-directional current output during the periods of conduction of said tube, a second source of alternating current potential having essentially a square waveform and a frequency equal to the frequency of current from said first source, means connecting said second source across said rectifier tube control and cathode electrodes in opposite phase to the phase of the potential connected to said rectifier tube anode, the relative instantaneous polarities and potentials of only said first and second sources connected to the electrodes of said rectifier tube being such as to prevent the tube from firing and current from flowing therethrough, a third source of potential including a thermionic tube for generating a current with an intermittent peaked waveform and a repetition frequency equal to the frequencies of the potentials from said first and second sources, means for connecting said third source of potential across said rectifier tube control and cathode electrodes, the third source of potential having a peak voltage sufficient to fire said tube at times when the polarity of the potential connected to said rectifier tube anode is positive, said thermionic tube having a warm-up interval at least equal to the warm-up interval of said means to heat said rectifier tube cathode, timing means for said third source to determine the instant of generation of said peak voltage during each cycle of the potential connected to said rectifier tube anode, control means for said timing means to be responsive to variations in the uni-directional current output in a manner to vary the instant of generation of said intermittent potential within a given cycle of the potential connected to said rectifier tube anode whereby the instant when said tube is fired may be varied to thereby vary the total tube conduction period and maintain constant and uni-directional current output, and switch means in said control means connected when closed to predetermine the instant of generation of said intermittent potential to occur only at times when the polarity of the potential connected to the anode of said rectifier tube is negative to thus prevent the tube from firing and current from flowing therethrough to thereby reduce the uni-directional current output to zero.

17. The invention of claim 1 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, the warm-up interval for the cathode of said delay tube being sufficient to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

18. The invention of claim 3 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, the warm-up interval for the cathode of said delay tube being sufficient to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

19. The invention of claim 1 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, means connecting the control electrode of said delay tube in series with a bias resistance to the cathode of said delay tube, and means connecting a capacitor between the control electrode of said delay tube and the negative terminal of said direct current source, the relative values of said bias resistance and said capacitor together with the warm-up interval for the cathode of said delay tube being such as to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

20. The invention of claim 3 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, means connecting the control electrode of said delay tube in series with a bias resistance to the cathode of said delay tube, and means connecting a capacitor between the control electrode of said delay tube and the negative terminal of said direct current source, the relative values of said bias resistance and said capacitor together with the warm-up interval for the cathode of said delay tube being such as to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons.

21. The invention of claim 1 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to he anode of said rectifier tube is positive, delay circuit means connecting the control electrode of said delay tube in series with a bias resistance to the cathode of said delay tube, delay circuit means connecting a capacitor between the control electrode of said delay tube and the negative terminal of said direct current source, the relative values of said bias resistance and said capacitor together with the warm-up interval for the cathode of said delay tube being such as to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons, and a uni-directional conducting device connected between the control and anode electrodes of said delay tube in a manner to substantially instantaneously discharge said capacitor when the potential of the direct current from the positive terminal of said source is reduced to zero whereby the time delay tube and associated delay circuit is resettable.

22. The invention of claim 3 wherein said control means includes a control tube having at least anode, control and thermionic cathode electrodes, means connecting a portion of said direct current output voltage across the control and cathode electrodes of said thermionic tube, a time delay tube of the type having a thermionically heated cathode together with control and anode electrodes, means connecting the cathode of said delay tube in series with a load resistance to the anode of said control tube, a source of direct current having positive and negative terminals, means connecting the positive terminal of said source of direct current to the anode of said delay tube and the negative terminal of said source of direct current to the cathode of said control tube, means connecting the anode of said thermionic tube to said timing means in a manner such that a rise in the potential of said anode causes the instant of generation of said peak voltage to occur earlier in the time that the polarity of the potential connected to the anode of said rectifier tube is positive, delay circuit means connecting the control electrode of said delay tube in series with a bias resistance to the cathode of said delay tube, delay circuit means connecting a capacitor between the control electrode of said delay tube and the negative terminal of said direct current source, the relative values of said bias resistance and said capacitor together with the warm-up interval for the cathode of said delay tube being such as to initially prevent the rise in potential of the anode of said thermionic tube to a value sufficient to cause the instant of generation of said peak voltage to occur at times when the polarity of the potential connected to the anode of said rectifier tube is positive and for a predetermined length of time until after said means to heat the rectifier tube cathode is operative to produce a stream of electrons, and a uni-directional conducting device connected between the control and anode electrodes of said delay tube in a manner to substantially instantaneously discharge said capacitor when the potential of the direct current from the positive terminal of said source is reduced to zero whereby the time delay tube and associated delay circuit is resettable.

References Cited in the file of this patent
UNITED STATES PATENTS

| Number | Name | Date |
|---|---|---|
| 1,281,518 | Chubb | Oct. 15, 1918 |